United States Patent

[11] 3,608,928

| [72] | Inventor | John D. Hooker<br>309½ S. Marina, Prescott, Ariz. 86301 |
|---|---|---|
| [21] | Appl. No. | 37,653 |
| [22] | Filed | May 15, 1970 |
| [45] | Patented | Sept. 28, 1971 |

[54] TRAILER SKIRT
5 Claims, 4 Drawing Figs.

[52] U.S. Cl. ..................................................... 280/150 R, 52/DIG. 3
[51] Int. Cl. ..................................................... B60r 27/00
[50] Field of Search ......................................... 280/150 R; 52/127; 160/DIG. 3

[56] References Cited
UNITED STATES PATENTS

| 3,106,411 | 10/1963 | Holmes | 280/150 R |
| 3,216,741 | 11/1965 | Newlin et al. | 280/150 R |
| 3,218,091 | 11/1965 | Doak | 280/150 R |
| 3,256,655 | 6/1966 | Teeter | 280/150 R |

Primary Examiner—Benjamin Hersh
Assistant Examiner—Robert R. Song
Attorney—Herbert L. Martin ABSTRACT: The trailer skirt comprises a plurality of panels arranged around the lower edge of the trailer for enclosing the space therebeneath. The panels are individually held in place against the trailer body at the top and against ground stops at the bottom by resilient, readily detachable means connected between the trailer frame and the panels. These resilient means may be in the form of either weights or springs, and are connected to the panels by a hook-and-eye connection whereby the panels may be removed by merely pulling the top edges away from the trailer body far enough to reach in and unhook the connection.

PATENTED SEP28 1971 3,608,928
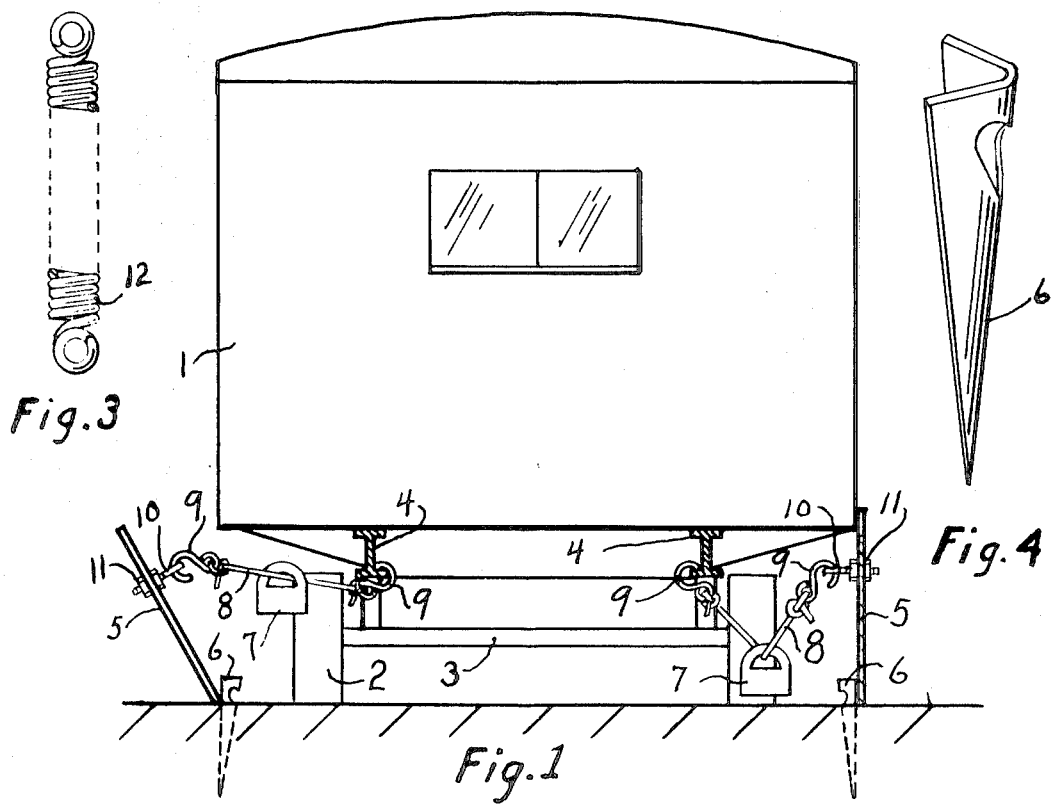
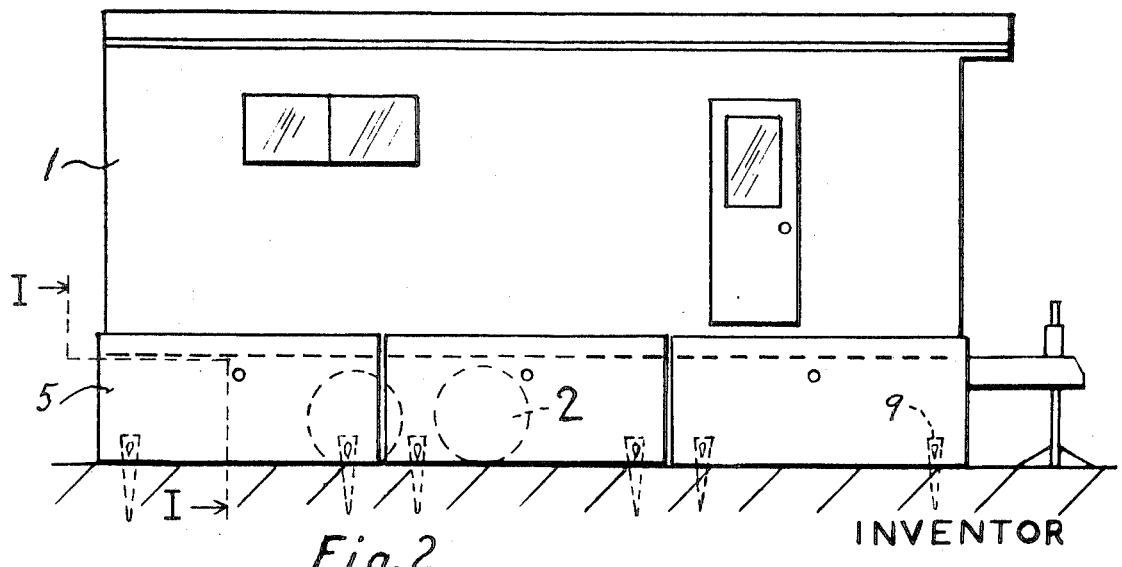
INVENTOR
John D. Hooker
BY Herbert L. Martin Atty.

TRAILER SKIRT

Trailer skirts are being extensively used to enclose the space beneath the floors of trailers and mobile homes. In addition to improving the outside appearance of such living quarters, they also provide an insulating space beneath the floor, thereby reducing heat losses in cold weather. Many trailer part residents, finding themselves without sufficient storage space, attempt to make use of the space beneath the trailer for this purpose. But since most trailer skirts are more or less permanently attached to the trailer (as by means of nails, screws, etc.) this cannot be done without considerable work and bother. The result is that very often one or more sections will be left off for convenience, thereby creating an unsightly appearance as well as destroying the heat-insulating feature of the enclosure. By making the skirt panels readily removable and replaceable, however, these desirable features can be retained while at the same time facilitating the use of the space for storage purposes.

It is accordingly an object of the invention to provide a trailer skirt structure that is easily adaptable to variously dimensioned trailers and yet readily removable to provide quick and easy access to the space therebeneath.

More particularly, it is an object of the invention to provide a trailer skirt which is made up of a plurality of edge-abutting panels which are individually held in place by yieldable, readily detachable retainers, whereby the panels may be held in good weathertight position, yet permitting any one or more panels to be independently removed. By thus having each panel separately removable, any desired size of access opening may be had by removing the necessary number of panels. Objects such as bicycles, building materials or even small boats, for example, may thus be conveniently stored out of sight.

Still other advantages will become apparent to one skilled in the art from the following description taken in conjunction with the accompanying drawing in which:

FIG. 1 is a partial sectional view taken on line I—I of FIG. 2. Additionally it shows one panel in normal position with the one on the left side pulled out at the top to provide access to the detachable retainer.

FIG. 2 is a side view of the trailer with the skirt panels in position.

FIG. 3 is an enlarged view of an alternative spring-type retainer for holding the panels in place.

FIG. 4 is an enlarged view of one form of ground stop means for positioning the lower edges of the panels.

In FIG. 1 the trailer body 1 is shown with an undercarriage comprising wheels 2, axle 3 and the conventional frame structure including longitudinally extending I-beams 4 supported thereby. Skirt panels 5, which may be made of any suitable material such as plywood, sheet metal, or "Masonite" for example, are dimensioned to extend from the ground into slightly overlapping relationship with the side and end walls of the trailer. The bottom edges of the panels are fixed by ground stops shown as stakes 6 driven in the ground directly beneath the trailer walls and in the plane of the outer surface thereof. Each panel is provided with a threaded eyebolt 10 clamped thereto by nuts 11.

The resilient retainer shown in FIG. 1 is of the weight type, and comprises a weight 7 supported by cord 8 having a hook 9 at each end thereof. With one end of this suspension 8 hooked in eyebolt 10 and the opposite end hooked over the directly opposite portion of I-beam 4, with the panel will be yieldably biased inwardly against the trailer body at the top and against ground stakes 6 at the bottom. The slack in the cord must be sufficient to permit the top edge of the panel to be withdrawn far enough to insert the hand and release hook 9.

The ground stakes 6 may be of any desired form, although it has been found that conventional metal tent stakes of the type shown in FIG. 4 serve this purpose very satisfactorily.

As a matter of convenience in the use of the weighted retainer of FIG. 1, a small eyelet may be attached to the underneath side of the trailer floor adjacent the eyebolt 10 into which hook 9 may be engaged after it is unhooked from the panel. This would keep the retainer suspended, thereby preventing its release from the I-beam. It would also indicate a region which must be left clear of stored material in order to avoid interference with normal operation of the retainer weight.

In some instances it may be found preferable to replace weighted suspensions 7, 8 with springs such as that illustrated at 12 in FIG. 3 in order to avoid possible above-mentioned interference by objects under or near the weights. It has been found that conventional screen door springs serve this purpose very well, having sufficient strength to hold the panels tight against the trailer, yet with sufficient stretch to permit easy access to the hooks 9. Hooks 9 may be attached directly to the ends of spring 12 or by means of flexible cords if greater length is needed. If greater tension is desired, as in areas where strong winds might tend to rattle the panels, each panel may be held by two springs in parallel.

It will be understood that panels of any desired lengths may be used. Where they are made of plywood or "Masonite" for example, they may be readily cut and tailored to the dimensions of any trailer by the do-it-yourself mechanic. The I-beams extending the full length of the trailer provide readily accessible means for attaching the retainer hooks 9 regardless of the size and number of the panels. The transversely extending floor supports adjacent the ends of the trailer provide equally convenient means for securing the end panels.

In operation, when it is desired to gain access to the storage space, it is merely necessary to grasp the upper edge of any panel and pull it out to the position shown in FIG. 1, thereby providing sufficient clearance to insert the hand and unhook fastener 9. The free panel may then be completely removed, thereby providing an access opening the size of the panel. If a larger opening is needed, an adjacent panel may be similarly removed, thus making possible an opening of any desired size along the length of the trailer. The panels may be replaced just as quickly and easily as they were removed.

It will be apparent to one skilled in the art that various modifications may be made without departing from the spirit of the invention, the scope of which is indicated by the appended claims.

What is claimed is:

1. In combination with a house trailer or the like, having therebeneath longitudinally extending frame structure adjacent each side and laterally extending frame structure adjacent each end, skirt structure surrounding the lower edge of said trailer for enclosing the space therebeneath, said skirt structure comprising a plurality of panels extending between the ground and the trailer body in overlapping relation with the lower edge thereof, stop means adapted to be positioned in the ground beneath the edge of said trailer body to position the lower edges of said panels, and resilient retainer means extending between each panel and said trailer frame for yieldably urging said panels into tight contact with both said trailer body and said stop means.

2. The structure of claim 1 including readily detachable means for securing the retainer means to the panels and to said adjacent frame structure.

3. The structure of claim 2 wherein the detachable means comprises a hook secured to the retainer and engaging an eyebolt secured to the panel.

4. The structure of claim 3 wherein the retainer comprises a weight suspended on a cord having a hook on each end for detachable engagement respectively with the trailer frame and a panel eyebolt.

5. The structure of claim 3 wherein the retainer comprises spring means having a hook attached to each end for detachable engagement with the trailer frame and a panel eyebolt respectively.